UNITED STATES PATENT OFFICE.

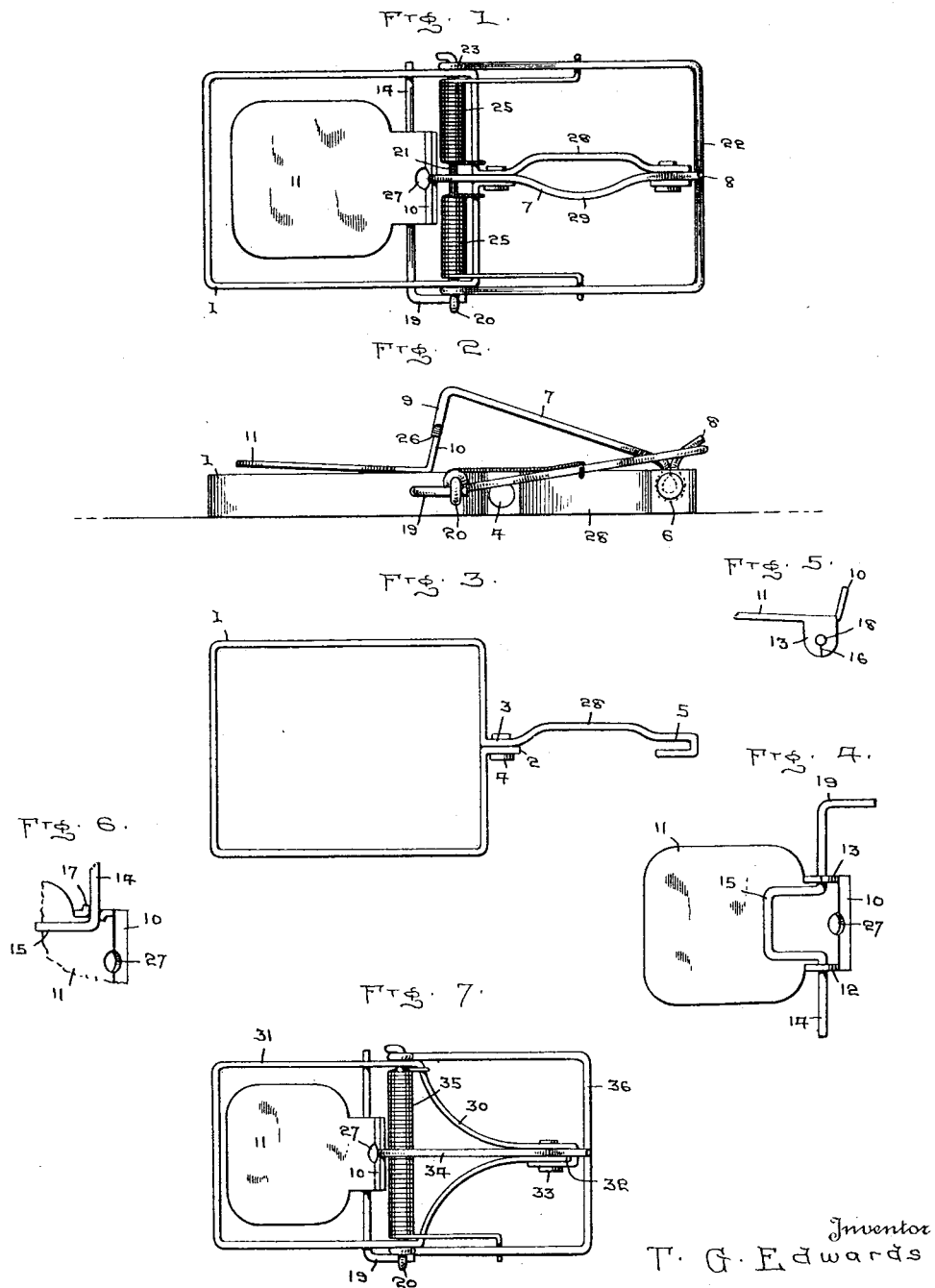

THOMAS G. EDWARDS, OF ARLINGTON, KENTUCKY.

TRAP.

1,176,666.

Specification of Letters Patent. Patented Mar. 21, 1916.

Application filed July 7, 1915. Serial No. 38,400.

*To all whom it may concern:*

Be it known that I, THOMAS G. EDWARDS, a citizen of the United States, residing at Arlington, in the county of Carlisle and State of Kentucky, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to that class adapted to be used for catching rodents, and my object is to provide a trap, all parts of which are constructed of metal.

A further object is to provide a frame for a trap formed of a single section of material. And a further object is to so construct the device that it may be produced at a minimum expense and rendered extremely strong and durable.

Other objects and advantages will be hereinafter set forth and more particularly pointed out in the accompanying specification.

In the accompanying drawings which are made a part of this application, Figure 1 is a top plan view of the trap in its set position. Fig. 2 is an edge elevation thereof. Fig. 3 is a plan view of the frame with the other parts of the trap removed. Fig. 4 is a bottom plan view of the treadle of the tripping mechanism. Fig. 5 is an edge elevation of the treadle. Fig. 6 is a fragmentary bottom plan view showing the manner of attaching the treadle to parts of the trap, and Fig. 7 is a top plan view of a slightly modified form of trap.

Referring to the drawings in which similar reference numerals designate corresponding parts throughout the several views, 1 indicates the frame of the trap which is preferably constructed of a flat strip of metal bent in substantially angular formation, one end of the member forming the frame having an angular ear 2 thereon, while the opposite end of the member forming the frame has an angular extension 3, said ear and extension being secured together in any suitable manner, as by means of a rivet 4. The extreme outer end of the extension 3 is bent upon itself to form a socket 5, which is adapted to receive an eye 6 of a trigger 7, said trigger being preferably formed from a section of wire and bent adjacent one end to form the eye 6.

The end of the trigger adjacent the eye 6 is extended upwardly and outwardly to form an inclined finger 8, while the opposite end of the trigger is provided with an angular extension 9 adapted to engage the upper edge of an upwardly extending flange 10 of a treadle 11. Depending from that edge of the treadle 11 having the flange 10 are ears 12 and 13 through which extends a supporting shaft 14, said shaft having a crank portion 15 at its longitudinal center which serves as a support for the treadle 11 and limits the downward movement thereof. In order to attach the treadle to the supporting shaft 14 and position an ear on each side of the crank 15, the ear 13 is slit, as shown at 16, so that the slit edges can be bent laterally, as shown at 17 in Fig. 6 to receive the supporting shaft, and after the supporting shaft has reached the opening 18, the ends 17 are again bent to their proper position, thus securing the ear to the supporting shaft.

The shaft 14 extends transversely through the side walls of the frame 1, one end of the shaft having an angular extension 19 thereon which extends through an eye 20 of a rod 21, said rod likewise extending transversely through the side walls of the frame, and by introducing the extension 19 through the eye, both the shaft and rod are held against rotation.

Coöperating with the rod 21 is an auxiliary frame 22, preferably constructed of wire, and having its ends provided with loops 23 which surround the rod 21 and provide a pivot point for the auxiliary frame, exteriorly of the main frame.

The auxiliary frame is in general outline similarly constructed to the frame 1 and coöperates with the frame in holding rodents. The auxiliary frame 22 is thrown into engagement with the frame 1 with sufficient force to hold a rodent impinged between the frames through the medium of coil springs 25, said springs being wound around the rod 21 and having their inner ends engaging the end section of the frame 1 on opposite sides of the extension 3 and are secured thereto, while the outer ends of said springs are extended outwardly and are hooked around the side arms of the auxiliary frame 22, and as said springs are placed under tension before being engaged with the two frames, they will exert extremely strong downward pressure on the auxiliary frame.

In order to hold the auxiliary frame in position to entrap the rodent between the two frames, the cross bar of the auxiliary frame is introduced below the free end of the inclined finger 8, said finger being retained in the path of the cross bar by elevating the treadle 11 and engaging the tapered edge 26 on the upper edge of the flange 10, the tension of the springs 25 being such as to hold the treadle in elevated position until a slight pressure is directed thereagainst when the extension 9 will leave the flange 10 and the trigger descend until the incline finger releases the auxiliary frame, whereupon the auxiliary frame will be thrown with great rapidity and force over the frame 1 to entrap whatever may have applied the pressure on the treadle.

The treadle 11 is so constructed that the trap may operate whether the treadle is depressed or elevated as an opening 27 is formed through the treadle and flange 10 at their point of intersection, said opening being in line with the extension 9 so that should an upward pressure be directed against the treadle and the extension pass forwardly of the flange, the end of the extension will drop through the opening 27 and permit the finger to release from the auxiliary frame. To provide means whereby the trigger 7 may be readily grasped to elevate the same, the extension 3 is provided with an offset portion 28 and the trigger 7 is provided with a registering bowed portion 29, so that when the trigger is in its lowered position, the finger can be readily introduced between the offset portion and bowed portion to raise the trigger.

In Fig. 7 of the drawings, I have shown a slightly modified form of frame and operating spring therefor, in which instance the ends 30 of the frame 31 are curved inwardly and outwardly, one of the ends overlapping the other end to form a socket 32 through which extends a rivet 33, said rivet serving to hold said extensions together and form a pivot for the trigger 34. In this instance, a single operating spring 35 is used, one end of which is attached to one arm of the frame 31, while the opposite end thereof is engaged with the auxiliary frame 36, said spring 35 extending substantially the full width of the frame 31.

In operation, the frame 1 is rested upon any solid object and the auxiliary frame 22 swung rearwardly until it passes below the path of the inclined finger 8, and when so positioned, the trigger 7 is elevated and the edge 26 of the extension rested upon the upper edge of the flange of the treadle. The trap is then placed in proper position and any suitable form of bait placed between the walls of the frame below the treadle so that the rodent in an endeavor to obtain the bait will either elevate or lower the treadle 11 and release the auxiliary frame from the inclined finger, when the springs will instantly throw said auxiliary frame into engagement with the main frame and entrap the animal endeavoring to obtain the bait.

In view of the simplicity of this device, it can be very cheaply constructed and as all of the parts are formed of metal, it will be very strong and durable and practically indestructible from use, and it will likewise be seen that the trap can be made in sizes for entrapping large or small rodents or animals of any nature. It will also be understood that the trap can be used with or without bait as by setting the trap and placing it in the runway of the rodents, the trap will be sprung when the rodent steps thereon in attempting to pass over the trap.

It will further be seen that in view of the fact the finger is introduced from below the trap to elevate the treadle to position the flange thereof in registration with the depending portion of the trigger, the fingers will not be injured should the trap be accidentally sprung.

Having thus fully described my invention what I claim as new and desire to secure by Letters Patent is:—

1. A trap comprising a frame formed from a single flat piece of metal, one of the ends being formed into an extension and the opposite end into an ear, means to secure said ear and extension together to hold the frame in substantially angular formation, said extension having an offset portion and its free end bent to form a socket, a trigger having an eye adapted to enter said socket, means engaging said eye forming a pivot for the trigger, an inclined finger at the pivoted end of the trigger, an angular extension at the opposite end thereof, a supporting shaft extending transversely through the frame, a treadle pivotally mounted on said shaft, an upwardly extending flange adapted to be engaged by said extension, said shaft having a crank portion to limit the downward movement of the treadle, an auxiliary frame pivoted to the main frame, and springs carried by the main frame and engaging the auxiliary frame under tension whereby the auxiliary frame will be engaged with the main frame under tension.

2. A trap comprising a frame having an extension, the free end of said extension having a socket formed therein, a trigger having an eye adapted to be pivotally secured in said socket, an inclined finger on the trigger, a depending extension at the opposite end of the trigger, a supporting shaft extending transversely through the frame, said shaft having a crank portion, a treadle pivoted to said shaft, said crank portion limiting the movement of the treadle in one direction, an upstanding flange on the treadle adapted to be engaged by the depending portion of the trigger to hold the trigger against movement, a rod extending transversely through the frame, an auxiliary frame pivoted to the rod and adapted to be engaged and held against movement by said finger, and spring means for moving said auxiliary frame in engagement with the main frame under tension when the auxiliary frame is released from said finger.

3. A trap, comprising a main frame formed of a flat section of metal and having an integral extension, said extension having an offset portion in its length and a socket at its free end, a trigger pivoted in said socket, said trigger having a bowed portion registering with the offset of the extension, an auxiliary frame, means on the trigger to engage the auxiliary frame and hold the same inoperative, a supporting shaft extending transversely through the frame, said shaft having a crank portion, a treadle pivoted to said shaft and coöperating with said trigger, said crank portion limiting the movement of the treadle in one direction, and spring means to operate said auxiliary frame when released from the trigger.

4. A trap comprising a frame, an auxiliary frame, a rod extending through the first frame on which said auxiliary frame is mounted, said rod having an eye at one end, a treadle having depending ears, a shaft extending through said ears and through said first frame, said shaft having a crank portion between said ears, an extension on the shaft adapted to engage the eye of said rod to hold said rod and shaft against rotation, means to operate said auxiliary frame, and additional means to hold said auxiliary frame inoperative.

5. A trap comprising a frame, an auxiliary frame pivoted thereto, means to operate said auxiliary frame, a trigger coöperating with the auxiliary frame, a treadle having depending ears, one of said ears having a slit therein, a shaft having a crank having a slit therein, said ears engaging said shaft on opposite sides of the crank portion, and means to hold said shaft against rotation whereby the crank portion will limit the movement of said treadle.

In testimony whereof I have signed my name to this specification in the presence of two subscribing witnesses.

THOMAS G. EDWARDS.

Witnesses:
E. H. OWEN,
ROBT. P. HOCKER.

Copies of this patent may be obtained for five cents each, by addressing the "Commissioner of Patents, Washington, D. C."